United States Patent
Kobayashi et al.

(10) Patent No.: US 12,445,045 B2
(45) Date of Patent: Oct. 14, 2025

(54) POWER SUPPLY APPARATUS AND IMAGE FORMING APPARATUS

(71) Applicant: CANON KABUSHIKI KAISHA, Tokyo (JP)

(72) Inventors: Junya Kobayashi, Shizuoka (JP); Masaki Inagaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/302,357

(22) Filed: Apr. 18, 2023

(65) Prior Publication Data

US 2023/0344334 A1 Oct. 26, 2023

(30) Foreign Application Priority Data

Apr. 22, 2022 (JP) ................................. 2022-070835

(51) Int. Cl.
*H02M 1/32* (2007.01)
*H02M 3/335* (2006.01)

(52) U.S. Cl.
CPC ............. *H02M 1/32* (2013.01); *H02M 3/335* (2013.01)

(58) Field of Classification Search
CPC .......... H02M 1/32; H02M 3/335; H02M 1/36; H02M 1/0058; G03G 15/00; G03G 15/5004

USPC ................................................. 361/18, 86–87
See application file for complete search history.

(56) References Cited

U.S. PATENT DOCUMENTS

| | | | |
|---|---|---|---|
| 2019/0020268 A1* | 1/2019 | Saito | .................... G06K 15/406 |
| 2019/0181634 A1* | 6/2019 | Saji | ......................... H02M 1/32 |

FOREIGN PATENT DOCUMENTS

| | | |
|---|---|---|
| JP | 2010041834 A | 2/2010 |
| JP | 2010063304 A | 3/2010 |
| JP | 2011019372 A | 1/2011 |
| WO | 2018042937 A1 | 3/2018 |

* cited by examiner

*Primary Examiner* — Danny Nguyen
(74) *Attorney, Agent, or Firm* — Canon U.S.A., Inc. IP Division

(57) ABSTRACT

A switching control device, in a case where the overload state is detected after the switching operation is started and before the output voltage reaches a target voltage, performs a first process of maintaining a state where the switching operation is stopped and, in a case where the overload state is detected after the output voltage reaches the target voltage, performs a second process of stopping the switching operation and, after a lapse of a first time, resuming the switching operation.

15 Claims, 8 Drawing Sheets

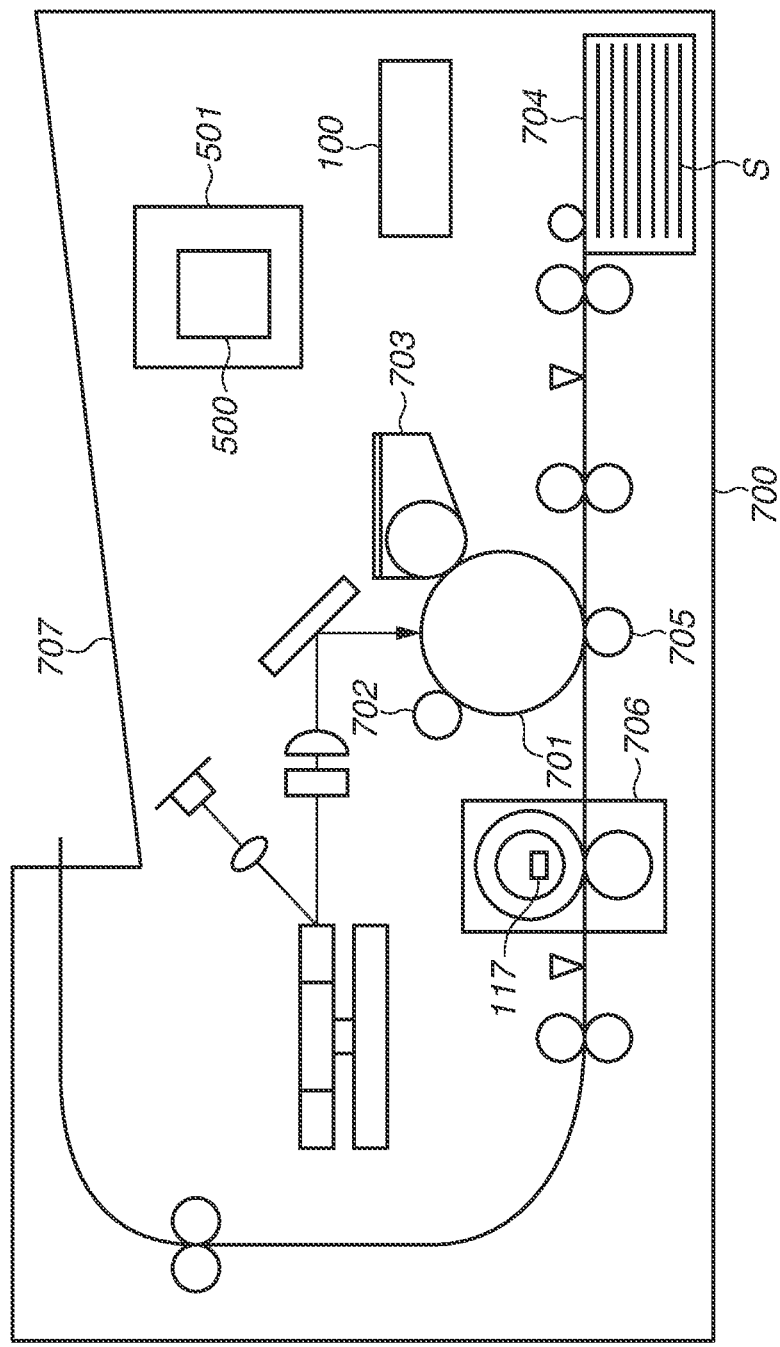

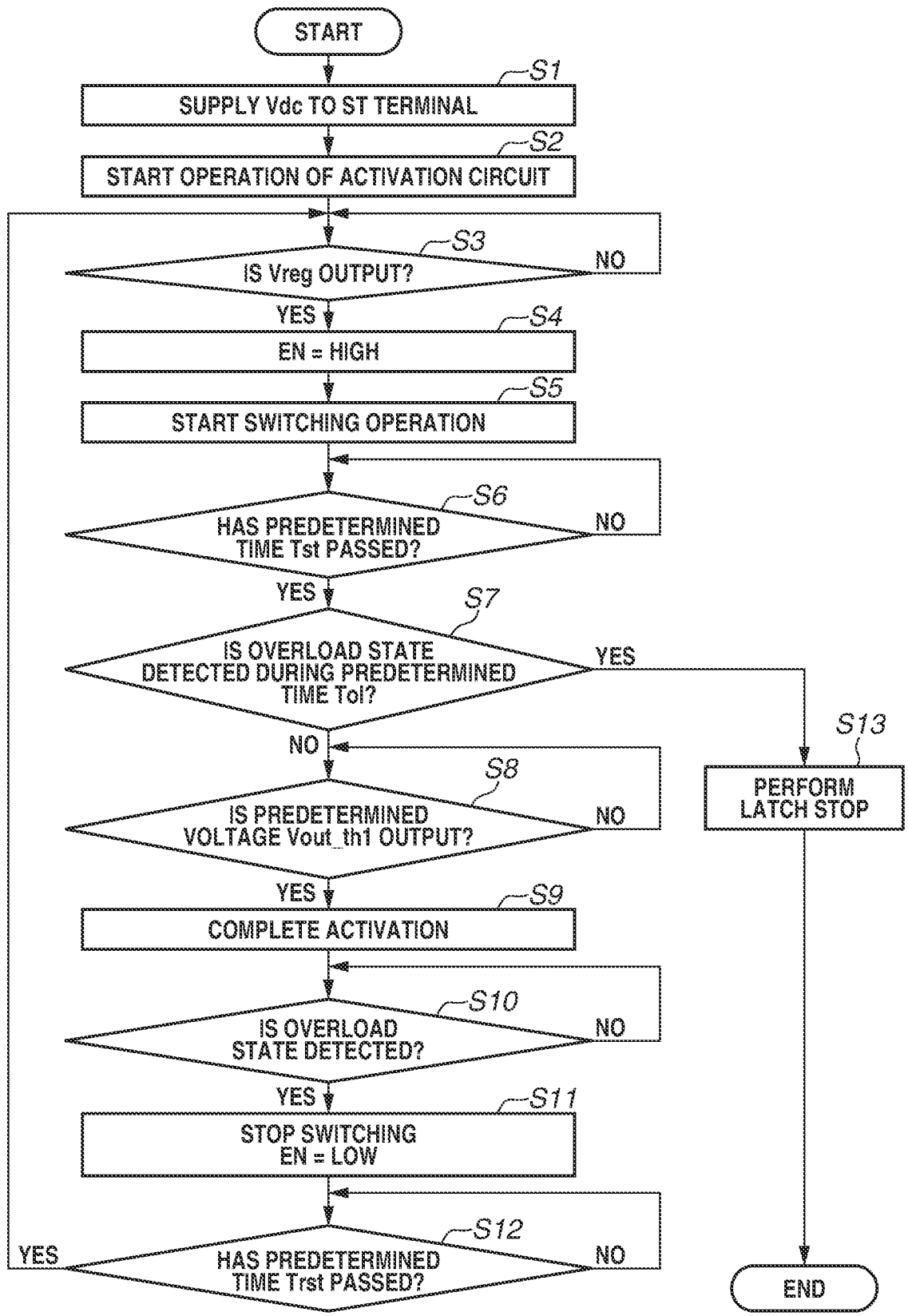

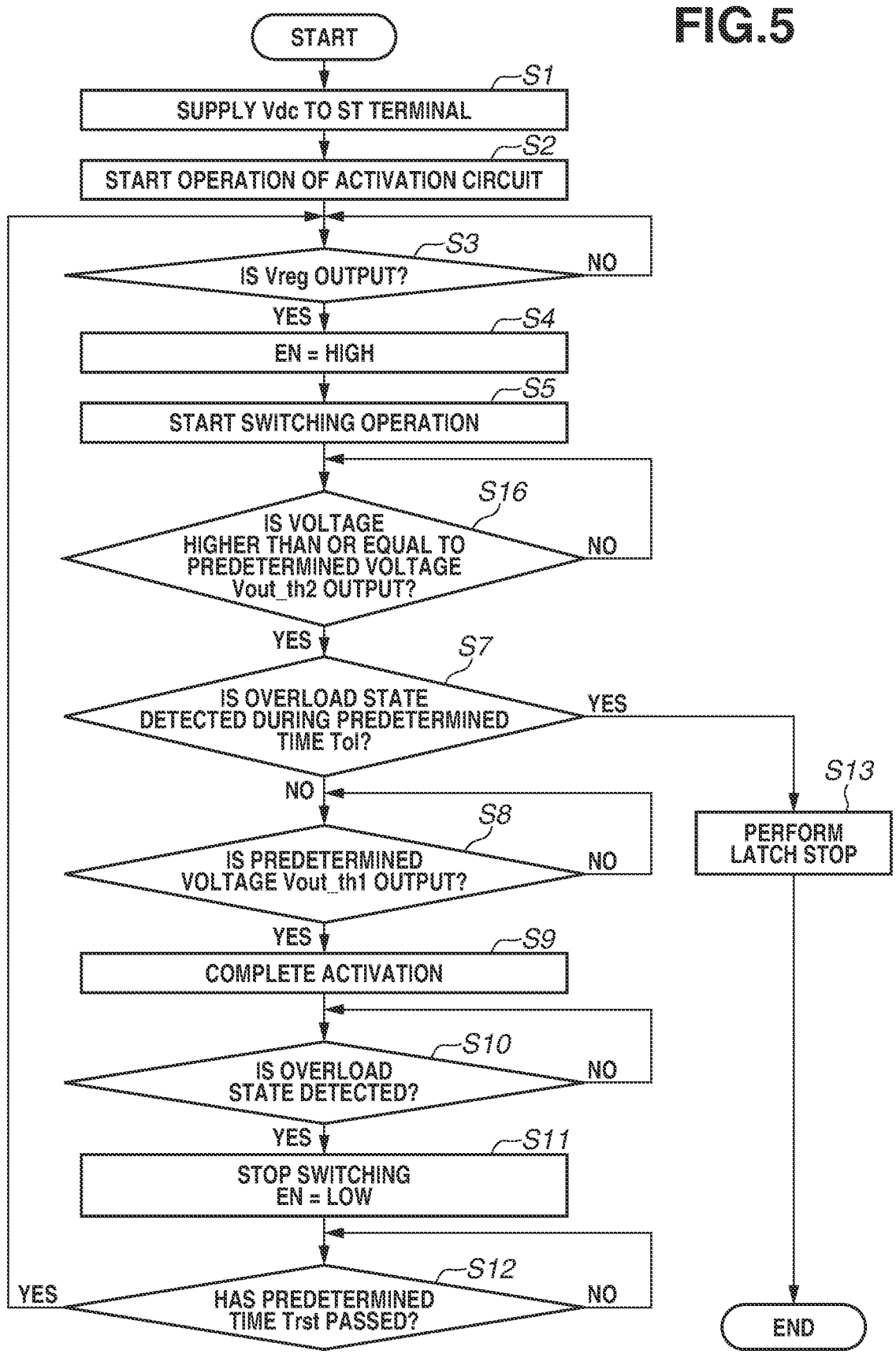

POWER SUPPLY APPARATUS AND IMAGE FORMING APPARATUS

BACKGROUND OF THE INVENTION

Field of the Invention

The present disclosure relates to a power supply apparatus and an image forming apparatus and relates to, for example, control in detecting an overload by a power supply apparatus with an overload protection function.

Description of the Related Art

A switching power supply has a function of stopping a switching operation to protect the switching power supply in a case where it is determined that an overload state has occurred in detecting an overcurrent or excess power. A configuration that selects either a restart protection method or a latch protection method in the above-described situation is discussed in, for example, Japanese Patent Application Laid-Open No. 2010-063304. Specifically, the restart protection method of starting the switching operation after a predetermined time is selected for a slight overload, whereas the latch protection method of maintaining a stopped state of the switching operation until a power supply of a control unit becomes a voltage lower than or equal to a predetermined voltage is selected for a severe overload.

In some cases, however, the protection is also needed for an overload state where a primary-side current increases due to a decrease in an alternating-current voltage of an alternating-current power supply. At this time, for example, in a case where a severe overload occurs and the latch protection method is selected, the stopped state of the switching is maintained even in a case where the decrease in the alternating-current voltage is temporary. Thus, in order to discharge the voltage of the control unit being latch-protected, a user needs to stop the supply of the alternating-current voltage by pulling out a plug from an electrical outlet and wait a predetermined time. From a usability perspective, it is undesirable to require the user to pull out the plug each time a temporary decrease in the alternating-current voltage occurs.

Selecting the restart protection method in a case where the slight overload occurs is advantageous in that an automatic recovery can be performed in a case where the decrease in the alternating-current voltage is temporary. On the other hand, in a case where a slight overload state occurs continuously, since an operation of recovering automatically and stopping the switching is repeated, an output voltage may become unstable. Thus, for example, in a case where an image forming apparatus includes the above-described power supply apparatus, a voltage of a display panel of the image forming apparatus becomes unstable, and a display image also becomes unstable. This may confuse the user. Furthermore, since the overload state occurs repeatedly, parts of the power supply apparatus may deteriorate. Thus, there is a demand for protection of the power supply apparatus as appropriate depending on an overload state that has occurred.

SUMMARY OF THE INVENTION

The present disclosure is directed to protecting a power supply apparatus as appropriate depending on an overload state that has occurred.

According to an aspect of the present disclosure, a power supply apparatus configured to supply an output voltage corresponding to a voltage induced by a secondary winding, the power supply apparatus includes a transformer including a primary winding, the secondary winding, and an auxiliary winding, a switching element connected to the primary winding and configured to perform a switching operation, a first control device configured to operate by being supplied with a first voltage and configured to control the switching operation of the switching element, and a first detection device configured to detect an overload state, wherein, in a case where the overload state is detected by the first detection device after the switching operation is started and before the output voltage reaches a target voltage, the first control device performs a first process of maintaining a state where the switching operation is stopped, and wherein, in a case where the overload state is detected by the first detection device after the output voltage reaches the target voltage, the first control device performs a second process of stopping the switching operation and, after a lapse of a first time, resuming the switching operation.

Further features of the present disclosure will become apparent from the following description of exemplary embodiments with reference to the attached drawings.

BRIEF DESCRIPTION OF THE DRAWINGS

FIG. 1 is a diagram illustrating an image forming apparatus according to a first exemplary embodiment.

FIG. 4 is a flowchart illustrating a control process according to the first exemplary embodiment.

FIG. 5 is a flowchart illustrating a control process according to a second exemplary embodiment.

DESCRIPTION OF THE EMBODIMENTS

Figure 2A:
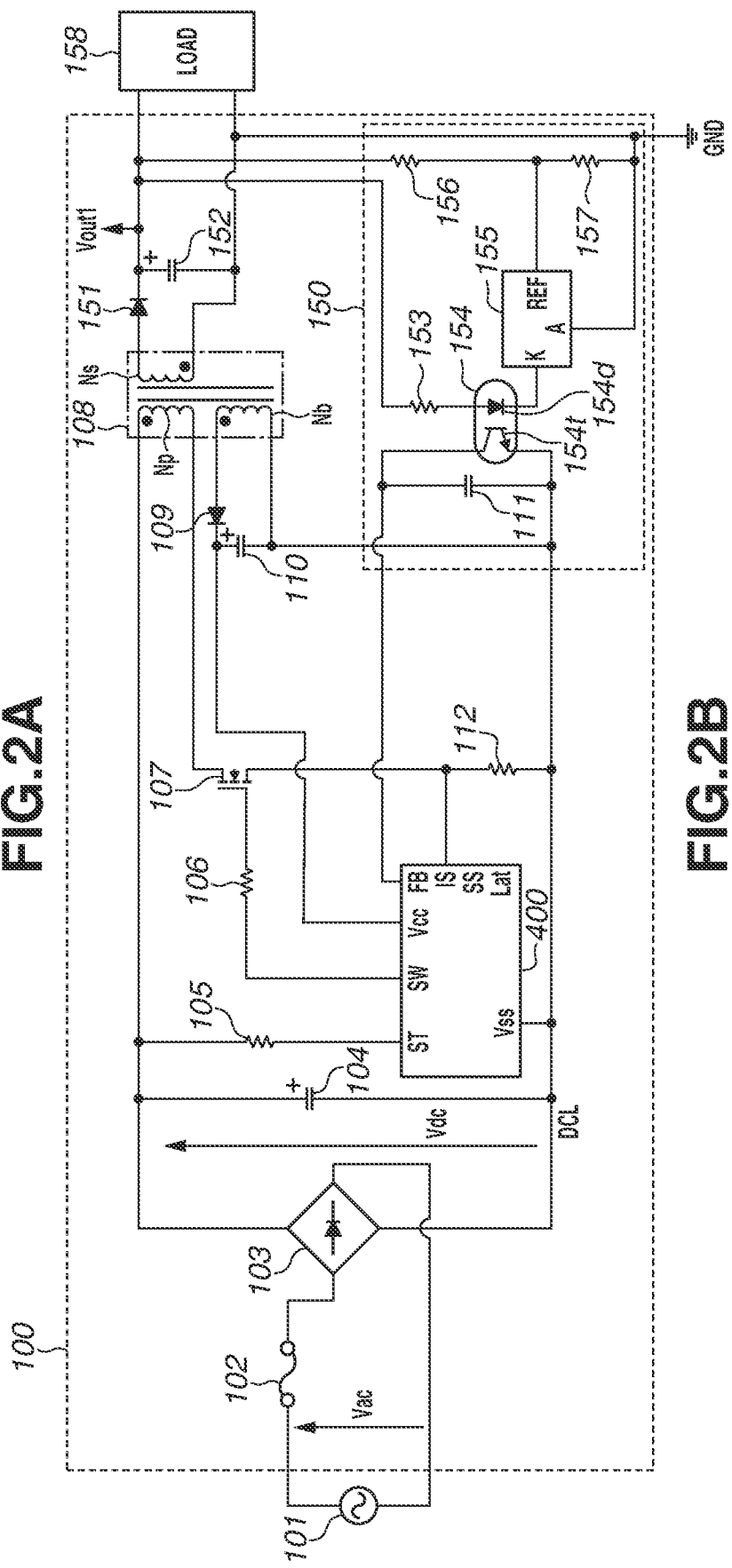
FIG. 2A is a circuit diagram illustrating a power supply apparatus according to the first exemplary embodiment.

Various exemplary embodiments of the present disclosure will be described in detail below with reference to the drawings.

[Image Forming Apparatus]

A case where a power supply apparatus 100 according to a first exemplary embodiment of the present disclosure is applied to an image forming apparatus will be described below. FIG. 1 is a diagram illustrating an entire laser beam printer 700 as an example of the image forming apparatus. The laser beam printer 700 (hereinafter, referred to as the printer 700) includes a photosensitive drum 701, a charging portion 702, and a development portion 703. The photosensitive drum 701 is an image bearing member on which an electrostatic latent image is to be formed. The charging portion 702 uniformly charges the photosensitive drum 701.

The development portion 703 develops an electrostatic latent image formed on the photosensitive drum 701 using toner. A transfer portion 705 transfers a toner image developed on the photosensitive drum 701 to a sheet S, which is a recording material fed from a cassette 704, and a fixing device 706 heated by a heater 117 fixes the transferred toner image to the sheet S. Then, the resulting sheet S is discharged to a sheet discharge tray 707. The printer 700 further includes the power supply apparatus 100, and the power supply apparatus 100 supplies power to a drive unit (not illustrated), such as a motor, and a control unit 501 including a central processing unit (CPU) 500, which is a second control unit. The control unit 501 and the CPU 500 control an image forming operation of an image forming unit, an operation of conveying the sheet S, and a temperature of the heater 117. The image forming unit as an image forming means includes at least the photosensitive drum 701, the development portion 703, and the transfer portion 705.

[Power Supply Apparatus]

Figure 2B:
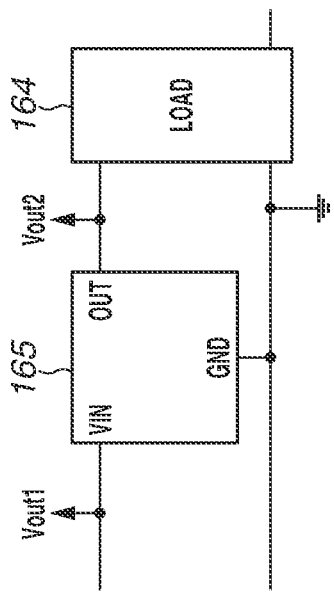
FIG. 2B is a circuit diagram illustrating a power supply apparatus according to the first exemplary embodiment.

FIGS. 2A and 2B are circuit block diagrams illustrating the power supply apparatus 100 according to the first exemplary embodiment. FIG. 2A illustrates a case where the power supply apparatus 100 is a flyback switching power supply. An alternating-current voltage is supplied to the power supply apparatus 100 from an alternating-current power supply 101 (commercial power supply). The alternating-current voltage supplied to the power supply apparatus 100 is supplied to a diode bridge 103 via a fuse 102. The alternating-current voltage is rectified by the diode bridge 103 into a pulsating current waveform with one side being positive. The alternating-current voltage with the pulsating current waveform is smoothed into a substantially direct current by an action of a primary electrolytic capacitor 104. The substantially direct current herein is not strictly limited to a direct current. A voltage between both ends (hereinafter, the voltage will be referred to as a voltage between the ends) of the primary electrolytic capacitor 104 is defined as a voltage Vdc, and a potential of a minus terminal of the primary electrolytic capacitor 104 is defined as a potential DCL.

The smoothed alternating-current voltage (hereinafter, referred to as the alternating-current voltage Vdc) is input to a primary winding Np of a transformer 108. Then, the alternating-current voltage Vdc returns to the alternating-current power supply 101 from the minus terminal of the primary electrolytic capacitor 104 and the diode bridge 103 via a field effect transistor (FET) 107, which is a switching element. On/off timings of the FET 107 are controlled by a switching control device 400.

The switching control device 400 is a first control device and includes an ST terminal, an SW terminal, an FB terminal, an IS terminal, a Vss terminal, a Vcc terminal, an SS terminal, and a Lat terminal. The alternating-current voltage Vdc is connected to the ST terminal via a resistor 105 and supplies power for the switching control device 400 to operate. The SW terminal is connected to a gate terminal of the FET 107 via a resistor 106, and a high-level voltage (about 10 V) or a low-level voltage (about 0 V) as a signal for driving (switching) the FET 107 (hereinafter, the signal will be referred to as a drive signal) is supplied from the SW terminal to the gate terminal of the FET 107. The FET 107 is on (conductive) in a case where the drive signal is at a high level, whereas the FET 107 is off (not conductive) in a case where the drive signal is at a low level. After the switching of the FET 107 is started, a voltage induced by an auxiliary winding Nb of the transformer 108 and rectified into a substantially direct current by a diode 109 and an electrolytic capacitor 110 is supplied to the Vcc terminal. By the foregoing operations, the power supply apparatus 100 continuously performs the switching operation. The Vss terminal of the switching control device 400 is a ground terminal and is connected to the potential DCL.

A voltage induced by the primary winding Np of the transformer 108 due to the switching of the FET 107 is converted into a voltage to a secondary winding Ns, and the power is rectified and smoothed by a rectification diode 151 and an electrolytic capacitor 152, whereby an output voltage Vout1 becomes a predetermined direct-current voltage. The output voltage Vout1 is output to a load 158 outside the power supply apparatus 100. The load 158 includes, for example, the drive unit such as a motor of the printer 700 in FIG. 1. The output voltage Vout1 is connected to a voltage feedback unit 150. The voltage feedback unit 150 outputs information indicating whether the output voltage Vout1 is the predetermined voltage to the switching control device 400.

Specifically, a voltage that is the output voltage Vout1 divided by resistors 156 and 157 is input to a REF terminal of a shunt regulator 155. A photodiode 154d of a photocoupler 154 is connected to a K terminal of the shunt regulator 155, and an A terminal of the shunt regulator 155 is grounded (GND). In a case where the output voltage Vout1 is lower than a voltage preset as a target for the output voltage Vout1 (hereinafter, the preset voltage will be referred to as a target voltage), the shunt regulator 155 turns on the photodiode 154d of the photocoupler 154 via a resistor 153. At this time, a phototransistor 154t of the photocoupler 154 is turned on, and a primary-side capacitor 111 connected to the FB terminal of the switching control device 400 is discharged.

By the foregoing operations, the voltage is output as an electric signal between the FB and Vss terminals (hereinafter, referred to as FB-Vss) of the switching control device 400. The switching control device 400 determines on and off timings of the FET 107 based on an FB-Vss voltage value and a voltage value (hereinafter, referred to as an IS terminal voltage) of a resistor 112. The resistor 112 is a second detection device and detects a current flowing through the FET 107. By the foregoing operations, the switching control device 400 controls the output voltage Vout1 to have the predetermined voltage value (i.e., target voltage). The SS and Lat terminals of the switching control device 400 will be described below.

As illustrated in FIG. 2B, a direct current to direct current (DC-DC) converter 165 is provided. The DC-DC converter 165 uses the output voltage Vout1 as an input and generates a predetermined voltage lower than the output voltage Vout1. The DC-DC converter 165 supplies an output voltage Vout2 (about 3.3 V) to a load 164 (Vout2<Vout1). Examples of the load 164 include, for example, the CPU 500 of the control unit 501 and a sensor (not illustrated) that detects a state of the printer 700. The DC-DC converter 165 includes a VIN terminal, a GND terminal, and an OUT terminal. The output voltage Vout1 is input to the VIN terminal, and the output voltage Vout2 is output from the OUT terminal. The GND terminal is grounded.

The switching control device 400 detects an overload state based on a result of the current detection by the resistor 112. Specifically, the switching control device 400 detects the overload state based on the IS terminal voltage. Thus, the switching control device 400 also functions as a first detection device that detects an overload state.

[Switching Control Device]

Figure 3:
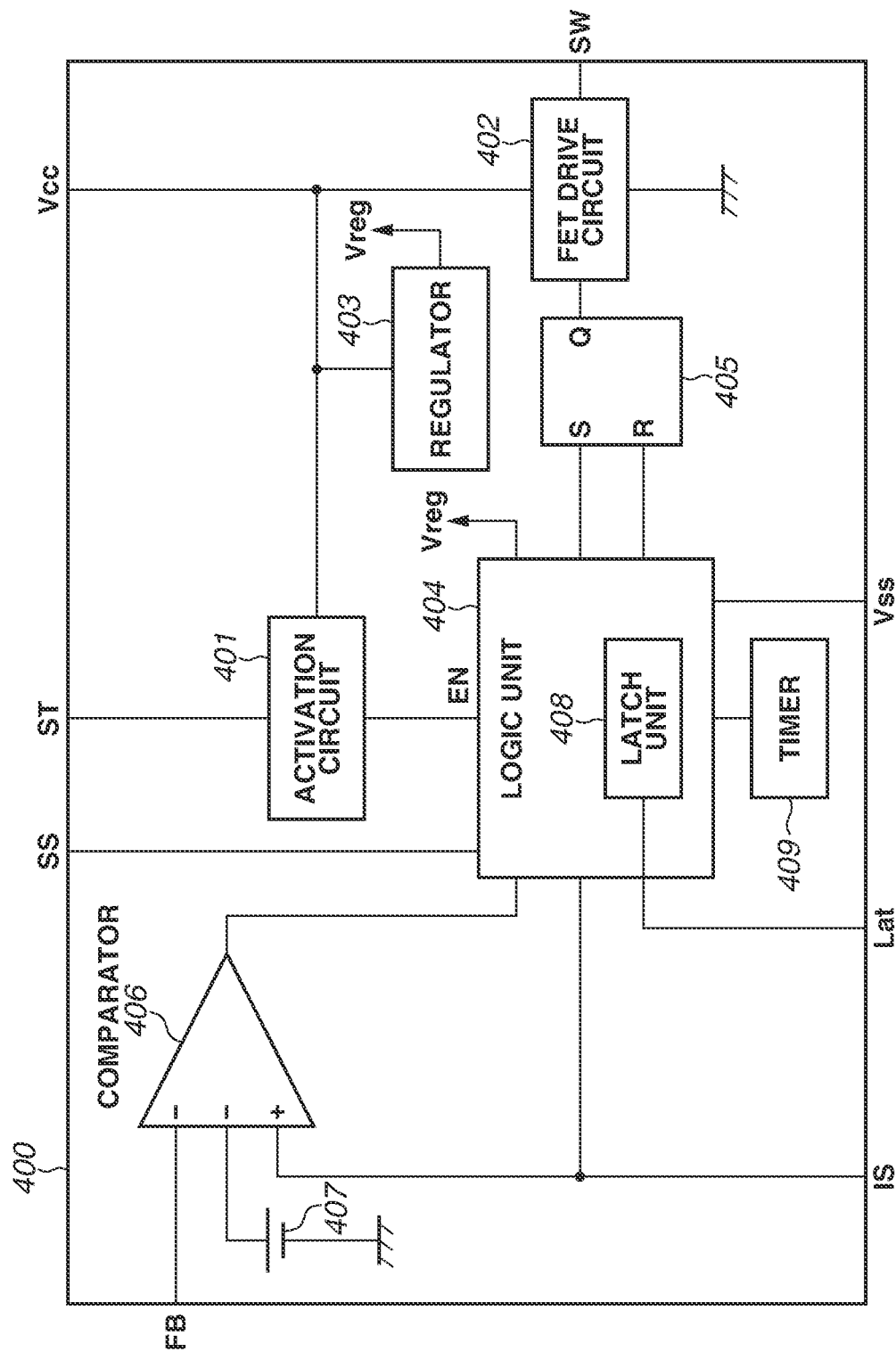
FIG. 3 is an internal block diagram illustrating a switching control device according to the first exemplary embodiment.

FIG. 3 is an internal block diagram illustrating the switching control device 400. FIG. 4 is a flowchart illustrating a switching control process performed by the switching control device 400 in a case where an overload occurs. How the switching control device 400 according to the first exemplary embodiment controls the switching will be described below with reference to FIGS. 3 and 4. A frequency-fixing-on width control method will be described as an example of a switching control method. A switching frequency is 100 kHz.

A configuration and basic operations of the switching control device 400 will be described below with reference to FIGS. 3 and 4. In a case where the alternating-current voltage Vdc is supplied to the power supply apparatus 100, step S1 of processing illustrated in FIG. 4 is started. In a case where the alternating-current voltage Vdc is applied to the power supply apparatus 100, in step S1, power is supplied to the ST terminal of the switching control device 400. In step S2, the switching control device 400 with the power supplied in step S1 starts an operation of an activation circuit 401. The activation circuit 401 charges the Vcc terminal and generates a voltage Vcc for a FET drive circuit 402 and a regulator 403 to operate. The voltage Vcc is about 10 V (first voltage), which is higher than a gate threshold voltage (3 V to 5 V) of the FET 107. The regulator 403 herein generates a voltage Vreg for a logic unit 404 to operate. The voltage Vreg is about 4 V. In step S3, the switching control device 400 determines whether the voltage Vreg is generated (output) by the regulator 403. In a case where the switching control device 400 determines that the voltage Vreg is not generated by the regulator 403 (NO in step S3), the processing returns to step S3, whereas in a case where the switching control device 400 determines that the voltage Vreg is generated (YES in step S3), the processing proceeds to step S4. The phrase "the voltage Vreg is generated" herein refers to the voltage Vreg being about 4 V. In step S4, the switching control device 400 causes the activation circuit 401 to transmit a high-level EN signal (EN=High) to the logic unit 404. In step S5, as the high-level (about 4 V) EN signal is input to the logic unit 404, the switching control device 400 starts the switching operation of the FET 107.

The switching control device 400 performs a soft start operation until a voltage of the FB terminal (hereinafter, the voltage of the FB terminal will be referred to as an FB terminal voltage) rises. The soft start operation is an operation of performing the switching at a predetermined frequency and on-duty until the FB terminal voltage is charged since, in a state where the output voltage Vout1 is not output, the FB terminal voltage is about 0 V and the switching control device 400 cannot perform feedback control. At this time, in order to drive the FET 107 at the predetermined on-duty, the logic unit 404 outputs a pulse signal to S and R terminals of an SR-flip-flop 405 at a predetermined timing. Then, the SR-flip-flop 405 outputs a pulse signal from a Q terminal to the FET drive circuit 402 and switches the FET 107 at the predetermined frequency and on-duty. A period of performing the soft start operation (hereinafter, the period will be referred to as a soft start period) herein is, for example, about 10 msec.

After the soft start period elapses, an on time is determined by a comparator 406 (Comp). The FB terminal voltage is input to a minus terminal of the comparator 406. The IS terminal voltage is input to a plus terminal of the comparator 406. A voltage source 407 is connected to the minus terminal of the comparator 406. An output terminal of the comparator 406 is connected to the logic unit 404. In the first exemplary embodiment, since the frequency-fixed method is described as an example, once the on time is determined, an off time is also determined. For example, in a case where the frequency is determined to be 100 kHz and the on time is determined to be 3 μsec, the off time is determined to be 7 μsec. In a case where the IS terminal voltage matches the FB terminal voltage, the comparator 406 outputs a high-level (about 4 V) signal to the logic unit 404, and the FET 107 is turned off. The voltage source 407 is a fixed voltage source and is provided to set an upper limit on the on time. For example, in a case where an open fault of the FB terminal occurs, the FET 107 continues to be on, so that the FET 107 may be broken down by the current. Thus, in a case where the IS terminal voltage matches a voltage (which is 0.5 V herein) of the voltage source 407, the comparator 406 is changed to low, and the FET 107 is turned off. This prevents the FET 107 from being broken down.

In step S6, the switching control device 400 determines whether a predetermined time Tst has passed using the logic unit 404. This is equal to the soft start period (e.g., 10 msec) described above and is set to determine an overload state excluding a transient overload state caused by the soft start operation. Hereinafter, the logic unit 404 uses a timer 409 in measuring the predetermined time Tst. In a case where the switching control device 400 determines that the predetermined time Tst has not passed using the logic unit 404 (NO in step S6), the processing returns to step S6, whereas in a case where the switching control device 400 determines that the predetermined time Tst has passed (YES in step S6), the processing proceeds to step S7.

In step S7, the switching control device 400 determines whether an overload state is detected during a predetermined time Tol using the logic unit 404. The IS terminal is connected to the logic unit 404. In determination of the overload state, in a case where an IS terminal voltage Vis is greater than a first threshold Vth1, the logic unit 404 determines that an overload state has occurred. Specifically, a state where Vis>Vth1 is determined as an overload state. In step S7, in a case where the state where Vis>Vth1 continues throughout the predetermined time Tol, the logic unit 404 determines that an overload state has occurred. Since the IS terminal voltage Vis has the pulsating current waveform, the IS terminal voltage Vis can be smoothed by a diode and a capacitor (not illustrated), or the logic unit 404 can perform a calculation such as averaging. In other words, the state where Vis>Vth1 does not necessarily have to continue throughout the predetermined time Tol, and in a case where an average value of the IS terminal voltage Vis output during the predetermined time Tol is greater than the first threshold Vth1, the logic unit 404 can determine that an overload state has occurred.

In a case where the switching control device 400 determines that an overload state is detected during the predetermined time Tol using the logic unit 404 (YES in step S7), the switching control device 400 determines that an overload has occurred in a continuous manner, and the processing proceeds to step S13. In step S13, the switching control device 400 performs a latch stop to stop the switching control using the logic unit 404, and the processing is ended. Herein, the latch stop is a first process and is a process of maintaining a state where the switching of the FET 107 is disabled, and the state is maintained until a voltage supplied to a circuit stopped by the latch stop decreases to a voltage to release the latch stop (hereinafter, the voltage will be referred to as a latch release voltage). Since the voltage is continuously supplied from the alternating-current power supply 101 to a primary-side circuit including the FET 107, in order to release the latch stop, the user needs to pull out a plug of the power supply apparatus 100 from an electrical outlet. Pulling out the plug stops the supply of the voltage from the alternating-current power supply 101, and the voltage of the primary-side circuit decreases. This makes it possible to recover the circuit from the latch stop state.

In the first exemplary embodiment, a latch unit 408 in the logic unit 404 performs the latch stop, and the latched state is maintained until the voltage Vcc becomes lower than or equal to the latch release voltage (which is 2 V herein). In other words, the latch release voltage is 2 V. Alternatively, a configuration may be employed where the latch stop is released in a case where the voltage Vreg becomes lower than or equal to the latch release voltage (e.g., 2 V). The determination result in step S7 is "YES" in a case where, for example, the alternating-current voltage Vdc is applied while the output of the secondary-side electrolytic capacitor 152 is short-circuited. In a case where an overload state is detected after the switching operation is started and before the output voltage Vout1 reaches the target voltage, the switching control device 400 performs the first process of stopping the switching operation until the voltage Vcc becomes a second voltage lower than the first voltage. In a case where the first process (latch stop) is performed, the switching operation becomes ready to resume in a case where the voltage supplied to the switching control device 400 changes to the second voltage lower than the first voltage as a result of the stop of the supply of the voltage from the alternating-current power supply 101.

In a case where the switching control device 400 determines that an overload state is undetected during the predetermined time Tol using the logic unit 404 (NO in step S7), the processing proceeds to step S8. In step S8, the switching control device 400 determines whether a predetermined voltage Vout_th1 (determined to be 24 V) (target voltage) is output as the output voltage Vout1 using the logic unit 404. In a case where the switching control device 400 determines that the predetermined voltage Vout_th1 is not output as the output voltage Vout1 using the logic unit 404 (NO in step S8), the processing returns to step S8. During the determination, the switching control is continued. In a case where the switching control device 400 determines that the predetermined voltage Vout_th1 is output as the output voltage Vout1 using the logic unit 404 (YES in step S8), the processing proceeds to step S9. Since the predetermined voltage Vout_th1 (24 V) (target voltage) is output as the output voltage Vout1, in step S9, the switching control device 400 completes the activation using the logic unit 404. The phrase "completes the activation" herein refers to a state where the predetermined voltage Vout_th1 (24 V) is output as the output voltage Vout1, and the state can be checked from, for example, an analog-to-digital converter (not illustrated) of the CPU 500.

Then, after the activation of the power supply apparatus 100 is completed and the output voltage Vout2 is output from the DC-DC converter 165, the control unit 501 operates, and the printer 700 starts operating. Unless an overload state such as a short-circuited output occurs or the alternating-current voltage decreases, the power supply apparatus 100 continues to output the predetermined voltage Vout_th1 (24 V) as the output voltage Vout1.

In step S10, the switching control device 400 determines whether an overload state is detected using the logic unit 404. An example of a cause of occurrence of an overload state herein is a great load temporarily applied to the load 158. In a case where the switching control device 400 determines that an overload state is undetected using the logic unit 404 (NO in step S10), the processing returns to step S10, whereas in a case where the switching control device 400 determines that an overload state is detected using the logic unit 404 (YES in step S10), the switching control device 400 determines that a temporary overload has occurred, and the processing proceeds to step S11. In step S11, the switching control device 400 stops the switching using the logic unit 404 and changes an EN terminal to a low level (about 0 V) (EN=LOW).

In step S10, the logic unit 404 determines that an overload state has occurred based on a condition that Vis>Vth2, where Vth2 represents a second threshold that is a voltage at which the switching control device 400 determines that an overload state has occurred. At this time, the logic unit 404 can instantly determine that an overload state has occurred, or the IS terminal voltage Vis can be averaged by a capacitor (not illustrated). While the first threshold Vth1 for an overload state in step S7 and the second threshold Vth2 for an overload state in step S10 are different values (Vth1≠Vth2), the first threshold Vth1 and the second threshold Vth2 can be the same value (Vth1=Vth2).

In step S12, the switching control device 400 determines whether a predetermined time Trst has passed using the logic unit 404. In a case where the switching control device 400 determines that the predetermined time Trst has not passed using the logic unit 404 (NO in step S12), the processing returns to step S12, whereas in a case where the switching control device 400 determines that the predetermined time Trst has passed (YES in step S12), the processing returns to step S3. In a case where a predetermined voltage (about 4 V) is output as the voltage Vreg in step S3, the above-described control is performed again. Specifically, the switching operation is resumed in step S5. A process in which the switching control device 400 stops the switching operation (step S11) and, after a lapse of the first time (YES in step S12), resumes the switching operation (step S5) is referred to as a second process. In a case where the switching control device 400 detects an overload state after the output voltage Vout1 becomes the target voltage, the switching control device 400 performs the second process.

Hereinafter, an operation of returning from step S11 (of stopping the switching) to step S3 and outputting the output voltage Vout1 again will be referred to as a reactivation. In a case where an overload state is temporary and is released in step S7, i.e., the overload state does not continue during the predetermined time Tol, the output voltage Vout1 is output again in step S8. Another example of a case where the result of the determination (of whether an overload state has occurred) in step S10 is YES is a case where the alternating-current voltage decreases. At this time, a decrease in the alternating-current voltage in a state where the printer 700 (the load 158 of the printer 700) is operating at a predetermined load increases the on-duty of the FET 107, so that the on time becomes longer than that in a case where the alternating-current voltage is high, and as a result, the IS terminal voltage Vis also increases. Consequently, even if the secondary side is not in an overload state, since an amount of current flowing through the FET 107 increases, the switching is stopped in step S11 in order to protect a rated value of the element and to provide thermal protection.

In a case where a configuration that does not have the latch stop function (functions of steps S7 and S13 in FIG. 4) and that performs the reactivation in a case where an overload state is detected is continuously in the overload state, since the reactivation is continuously performed, the output voltage becomes unstable. Consequently, for example, the supply of the voltage to the display panel of the printer 700 may also become unstable, and sometimes display on the display panel may be performed but other times the display may not be performed, which may confuse the user. This can be overcome.

As described above, in the present exemplary embodiment, in a case where an overload is detected by the logic unit 404 during the period (excluding the soft start period) before the completion of the activation of the power supply apparatus 100, the switching control device 400 presumes that an overload state has occurred in a continuous manner, and performs the latch stop.

An occurrence of an overload during a period shortly after the switching control device 400 starts operating indicates a high possibility of an occurrence of an overload in a continuous manner not only during the period but also in another period. Thus, the latch stop is selected in the present exemplary embodiment.

On the other hand, in a case where an overload is detected by the logic unit 404 after the activation of the power supply apparatus 100 is completed, the switching control device 400 presumes that a temporary overload state has occurred, and performs reactivation. As described above, in a case where a continuous overload has occurred, there is a high possibility of an occurrence of the overload also during a period shortly after the switching control device 400 starts operating.

Thus, conversely, in a case where an overload occurs after the activation of the power supply apparatus 100 is completed, there is a high possibility of an occurrence of a temporary overload.

Further, in the present exemplary embodiment, in order to prepare for an occurrence of a continuous overload after the completion of the activation of the power supply apparatus 100, whether an overload has occurred during the predetermined time Tol is determined prior to the reactivation, and the processing can proceed to the latch stop at this timing. Specifically, whether a continuous overload has occurred is determined based on the length of time of an occurrence of the overload after the power supply apparatus 100 is activated.

While the latch stop is performed by use of the latch unit 408 included in the switching control device 400 according to the first exemplary embodiment, the latch stop can be performed by an external signal supplied to the Lat terminal of the switching control device 400. Further, the switching control device 400 can use a CPU. In a case where the control is performed by the CPU, since control timings can be controlled, "has predetermined time Tst passed" described in step S6 in FIG. 4 can be changed to "has FB control started".

As described above, in the first exemplary embodiment, the power supply apparatus 100 is reactivated in a case where an overload state occurs due to some cause after the activation, the alternating-current voltage decreases temporarily, or the load is temporarily in an overcurrent state. Furthermore, in a case where a continuous overload state has occurred, the switching can be stopped by a latch stop when the power supply apparatus 100 is reactivated.

With the first exemplary embodiment, the power supply apparatus 100 is protected as appropriate depending on a state of an overload that has occurred.

A case where the power supply apparatus 100 according to a second exemplary embodiment is applied to the printer 700 will be described below. Each component having an identical configuration to its corresponding component according to the first exemplary embodiment is given the same reference numeral as the corresponding component, and a redundant description thereof is omitted. In the first exemplary embodiment, the latch stop is performed in a case where an overload state is detected during the predetermined time Tol with a timing at which the soft start period has elapsed as a starting point (step S7 in FIG. 4). In the second exemplary embodiment described below, the latch stop is performed in a case where an overload state is detected during the predetermined time Tol with a timing at which a predetermined voltage is output as the output voltage Vout1 as the starting point.

[Control According to Second Exemplary Embodiment]

The printer 700 has a configuration similar to that illustrated in FIG. 1. Circuit diagrams are similar to those in FIGS. 2A and 2B. An internal block diagram of the switching control device 400 is identical to that illustrated in FIG. 3. Thus, the reference numerals used in FIGS. 1 to 3 will be referred to below. FIG. 5 illustrates a flowchart according to the second exemplary embodiment. Each step that is similar to its corresponding step in the flowchart in FIG. 4 according to the first exemplary embodiment is given the same step number as the corresponding step. The flowchart is different from the flowchart according to the first exemplary embodiment (FIG. 4) in that step S6 according to the first exemplary embodiment is changed to step S16.

In step S16, the switching control device 400 determines whether a voltage higher than or equal to a predetermined voltage Vout_th2 (third voltage) is output as the output voltage Vout1 from a monitor circuit 600 (refer to FIG. 6A) described below. By the operation, the switching control device 400 determines whether the switching control device 400 is in a state of being ready to detect an overload state. Specifically, while whether the soft start operation is completed is determined based on measurement of an elapsed time in the first exemplary embodiment, whether the soft start operation is completed is determined based on the output voltage Vout1 in the second exemplary embodiment. This makes it possible to determine whether an overload state has occurred excluding a transient overload state caused by a start of the switching. In step S16, in a case where the switching control device 400 determines that the predetermined voltage Vout_th2 is not output as the output voltage Vout1 (NO in step S16), the processing returns to step S16, whereas in a case where the switching control device 400 determines that the predetermined voltage Vout_th2 is output as the output voltage Vout1 (YES in step S16), the processing proceeds to step S7.

[Monitor Circuit]

Figure 6A:
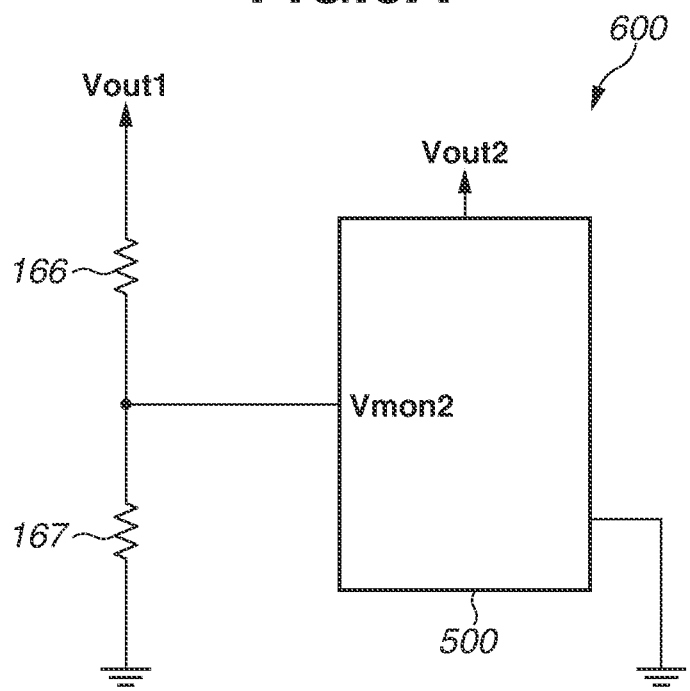
FIG. 6A is a diagram illustrating a monitor circuit according to the second exemplary embodiment.

FIG. 6A illustrates the monitor circuit 600 according to the second exemplary embodiment. The monitor circuit 600 monitors the output voltage Vout1. The monitor circuit 600 includes the CPU 500 and resistors 166 and 167. The CPU 500 is operated by the output voltage Vout2. A voltage that is the output voltage Vout1 divided by the resistors 166 and 167 is input to a Vmon2 terminal of the CPU 500. The Vmon2 terminal is an analog-to-digital converter, and with this configuration, the CPU 500 can monitor the output voltage Vout1. This makes it possible to determine whether the output voltage Vout1 is greater than or equal to the predetermined voltage Vout_th2 (which is 5 V herein) in step S16 in FIG. 5.

[Transmission Circuit]

Figure 6B:
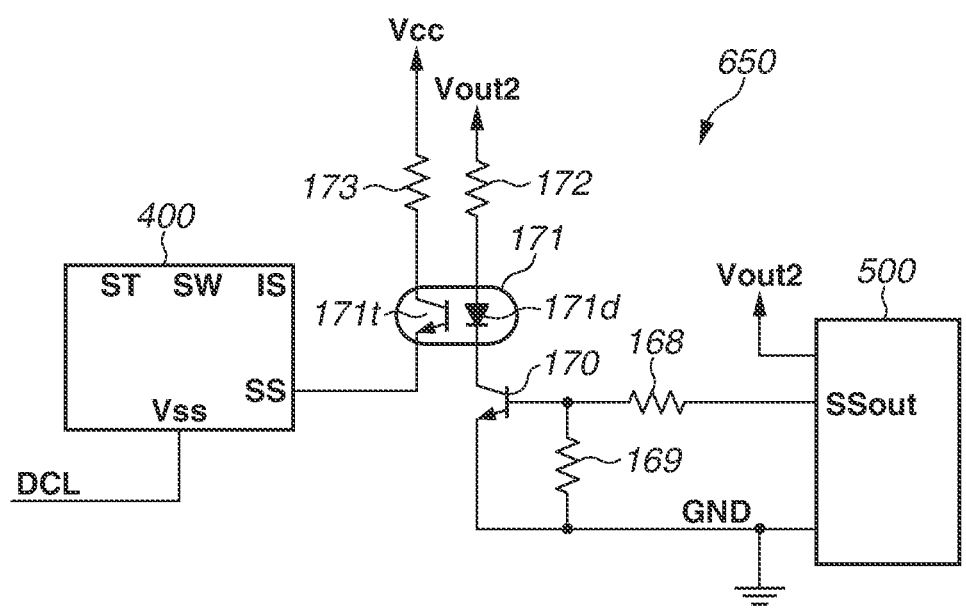
FIG. 6B is a diagram illustrating a transmission circuit.

FIG. 6B illustrates a transmission circuit 650 according to the second exemplary embodiment. The transmission circuit 650 transmits information indicating that the predetermined voltage Vout_th2 is output as the output voltage Vout1 to the switching control device 400. In a case where the predetermined voltage Vout_th2 is output as the output voltage Vout1, the CPU 500 of the monitor circuit 600 outputs a high-level (about 3.3 V) signal from an SSout terminal of the CPU 500. A voltage output from the SSout terminal is divided by resistors 168 and 169, and the divided voltage is supplied to a base terminal of a transistor 170. This turns on the transistor 170. Once the transistor 170 is turned on, the output voltage Vout2 is supplied via a resistor 172, and a photodiode 171d of a photocoupler 171 becomes conductive. Consequently, a phototransistor 171t of the photocoupler 171 becomes conductive, so that the voltage Vcc is supplied to the SS terminal of the switching control device 400 via a resistor 173. In the switching control device 400, in a case where the SS terminal changes to a high level (which is 10 V herein), it is determined that the predetermined voltage Vout_th2 is output as the output voltage Vout1, i.e., the switching control device 400 is in the state of being ready to detect an overload state, and the processing proceeds to step S7 in FIG. 5. The rest of the operation in FIG. 5 is similar to that according to the first exemplary embodiment, so that a redundant description thereof is omitted.

As described above, in the second exemplary embodiment, the latch stop can be performed in a case where an overload state has occurred with a timing at which a secondary-side output voltage reaches a predetermined voltage as the starting point.

As described above, with the second exemplary embodiment, the power supply apparatus 100 is protected as appropriate depending on a state of an overload that has occurred.

In a third exemplary embodiment, whether an overload state has occurred is determined based on a primary-side voltage and a primary-side current. Each component having an identical configuration to its corresponding component according to the first or second exemplary embodiment is given the same reference numeral as the corresponding component, and a redundant description thereof is omitted.

[Power Supply Apparatus]

Figure 7A:
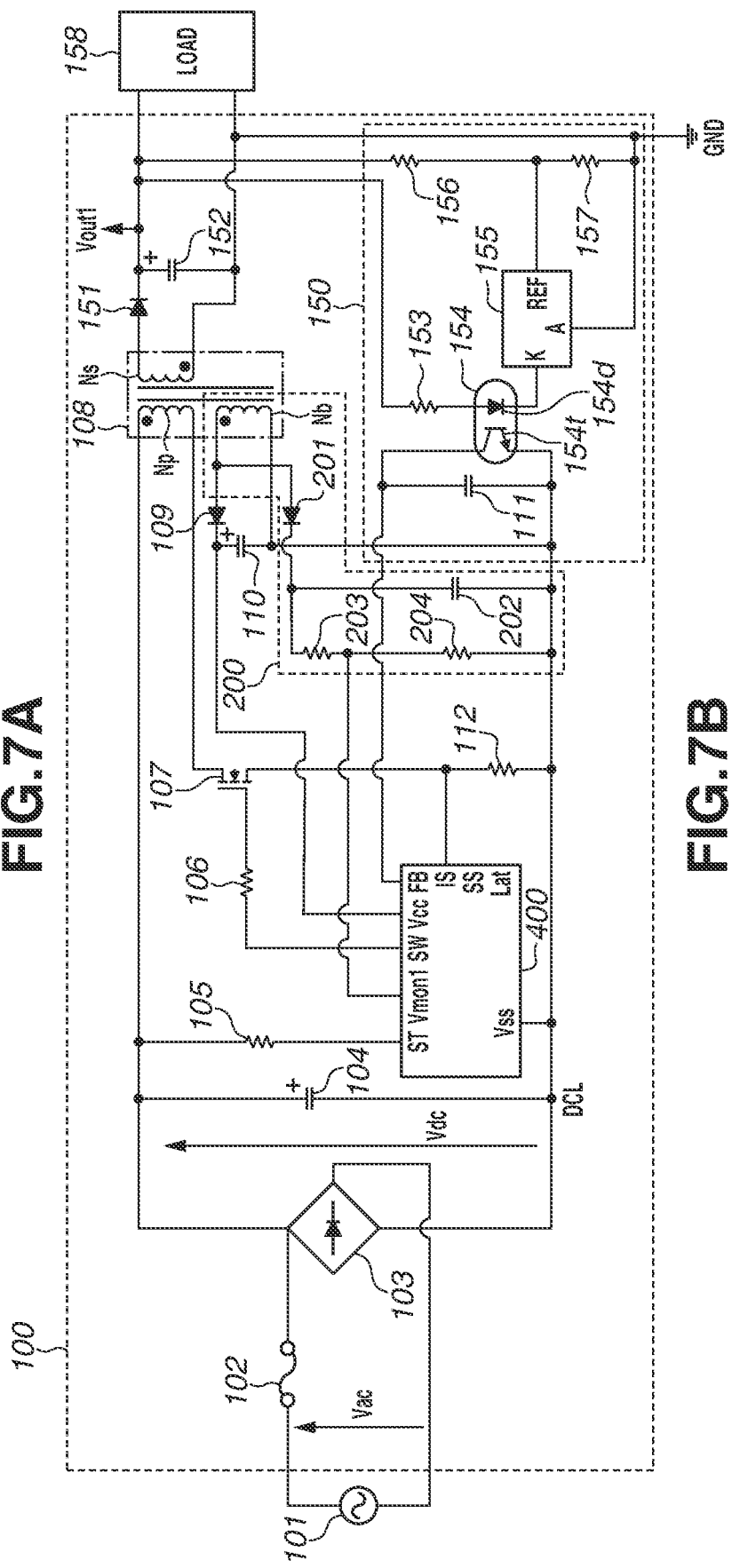
FIG. 7A is a circuit diagram illustrating a power supply apparatus according to a third exemplary embodiment.
Figure 7B:
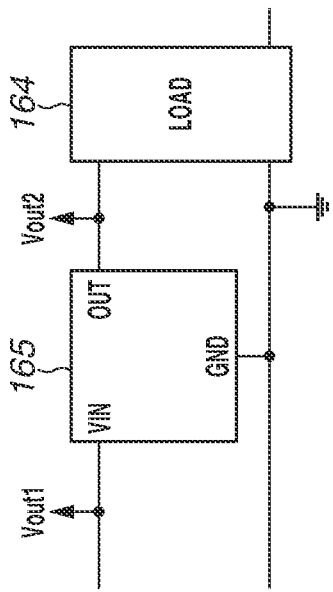
FIG. 7B is a circuit diagram illustrating the power supply apparatus according to the third exemplary embodiment.

FIGS. 7A and 7B each illustrates a circuit diagram according to the third exemplary embodiment. A difference from the first exemplary embodiment is that the power supply apparatus 100 includes a primary voltage detection unit 200, which is a third detection device. A voltage induced by the auxiliary winding Nb by the switching of the FET 107 is separated from a path of the diode 109 by a diode 201 and is stored in a capacitor 202. The voltage charged on the capacitor 202 is divided by resistors 203 and 204, and the divided voltage is input to a Vmon1 terminal of the switching control device 400.

Since the primary winding Np and the auxiliary winding Nb are wound in the same direction, the voltage induced by the auxiliary winding Nb is proportional to the voltage induced by the primary winding Np. Further, since the primary winding Np is wound forward, the voltage induced by the primary winding Np is proportional to the alternating-current voltage Vdc. Specifically, the alternating-current voltage Vdc and the voltage induced by the auxiliary winding Nb are also proportional to each other. Since the alternating-current voltage Vdc is a voltage generated by full-wave rectification of an alternating-current voltage of the alternating-current power supply 101 and smoothing of the rectified voltage by the primary electrolytic capacitor 104, when a forward voltage of the diode bridge 103 is ignored, formula (1) is substantially satisfied:

[Formula 1]

$$Vdc = \sqrt{2} \times Vac \quad (1)$$

where Vac is an effective voltage value of the alternating-current voltage of the alternating-current power supply 101.

Formula (2) is substantially satisfied:

[Formula 2]

$$V\,mon1 = \frac{R203}{R203 + R204} \times \frac{Nb}{Np} \times V\,dc, \quad (2)$$

where R203 is a resistance value of the resistor 203, R204 is a resistance value of the resistor 204, Vmon1 is a voltage of the Vmon1 terminal (hereinafter, the voltage will be referred to as the Vmon1 terminal voltage), Np is the number of windings of the primary winding Np, and Nb is the number of windings of the auxiliary winding Nb. With formulas (1) and (2), Vdc and Vac can be estimated from Vmon1.

[Switching Control Device]

Figure 8:
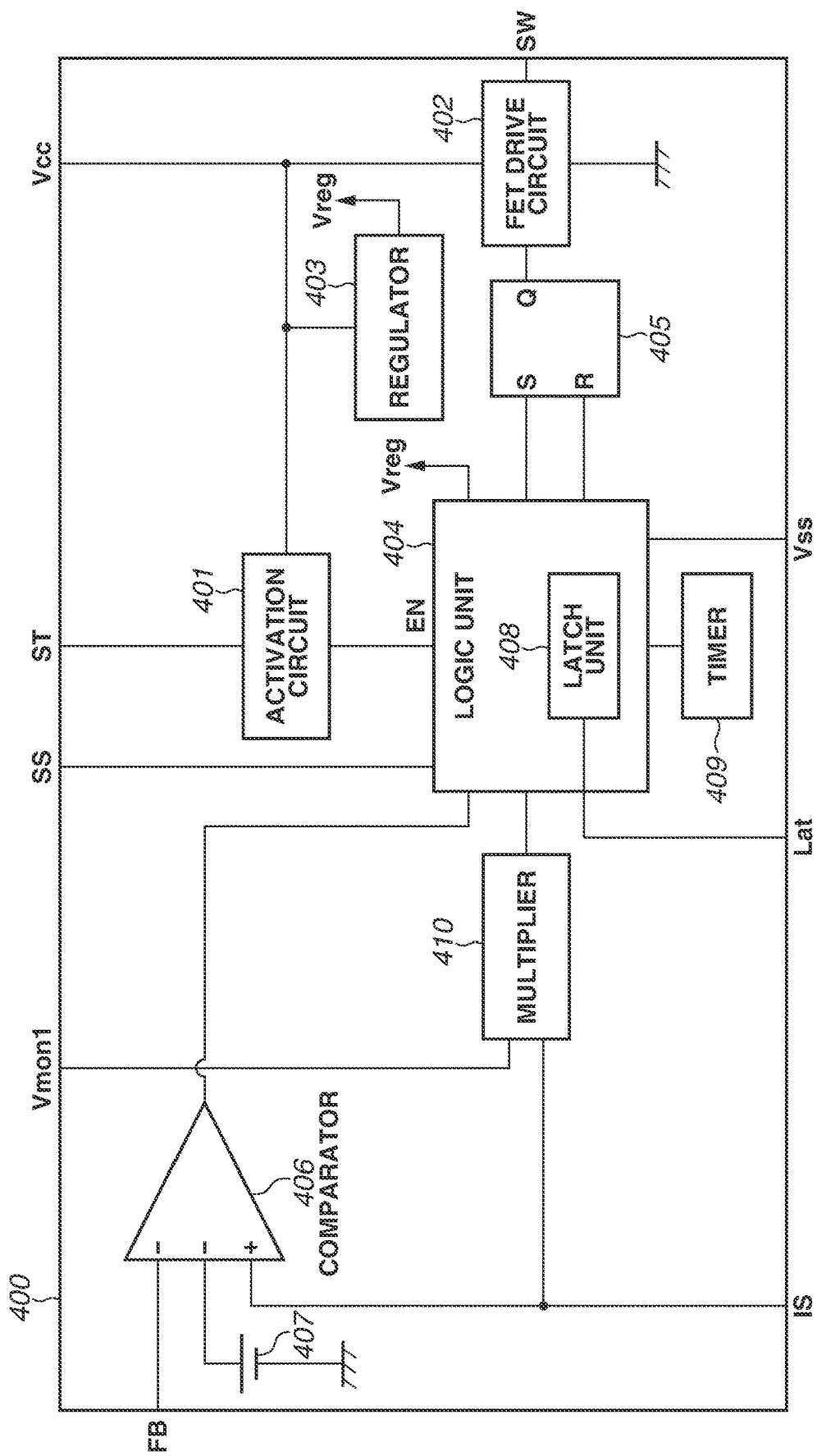
FIG. 8 is an internal block diagram illustrating a switching control device according to the third exemplary embodiment.

FIG. 8 illustrates an internal block diagram illustrating the switching control device 400 according to the third exemplary embodiment. A difference from the first exemplary embodiment is that the switching control device 400 includes a multiplier 410. The IS terminal voltage and the Vmon1 terminal voltage are input to the multiplier 410, and an output of the multiplier 410 is input to the logic unit 404. The multiplier 410 multiplies the Vmon1 terminal voltage by the IS terminal voltage and outputs a result of the multiplication to the logic unit 404. The logic unit 404 can estimate power information P (also a power value) to be consumed by a portion downstream of the primary electrolytic capacitor 104 based on the multiplication result input from the multiplier 410. Formula (3) is substantially satisfied:

[Formula 3]

$$P = Vis \times Vmon1 \quad (3)$$

where Vis is the IS terminal voltage.

As described above, the switching control device 400 detects an overload state based on the result of the current detection by the resistor 112 and the result of the detection by the primary voltage detection unit 200. Specifically, the switching control device 400 detects an overload state based on the IS terminal voltage and the Vmon1 terminal voltage. Thus, the switching control device 400 also functions as a first detection device that detects an overload state.

A flowchart according to the third exemplary embodiment will be described with reference to the flowchart in FIG. 4. The control according to the third exemplary embodiment is similar to that according to the first exemplary embodiment except that a different method is used in detecting an overload state in steps S7 and S10.

A third threshold Pth1 is a threshold for use in step S7 to determine that an overload state has occurred. The logic unit 404 determines that an overload state has occurred in a case where a condition that the power information P calculated from formula (3) is greater than the third threshold Pth1 (P>Pth1) is satisfied. Further, a fourth threshold Pth2 is a threshold for use in step S10 to determine that an overload state has occurred. The logic unit 404 determines that an overload state has occurred in a case where a condition that the power information P calculated from formula (3) is greater than the fourth threshold Pth2 (P>Pth2) is satisfied. The logic unit 404 can instantly determine that an overload state has occurred, or the processing can proceed to step S6 in a case where an overload state is detected for a predetermined time. While the third threshold Pth1 and the fourth threshold Pth2 are different values (Pth1≠Pth2), the third threshold Pth1 and the fourth threshold Pth2 can be the same value (Pth1=Pth2). Further, determination of the overload state based on the power information P is applicable to the control in FIG. 5 according to the second exemplary embodiment.

[Determination Based on Power and Determination Based on Current]

A difference between a configuration that detects an overload state based on the product of the current flowing through the primary-side and the primary-side voltage, i.e., power, and a configuration that detects an overload state based on the IS terminal voltage (Vis) indicating the current flowing through the primary-side according to the first exemplary embodiment will be described below. A case where the first threshold Vth1 and the second threshold Vth2 according to the first exemplary embodiment are the same value and the third threshold Pth1 and the fourth threshold Pth2 according to the third exemplary embodiment are the same value (Vth1=Vth2, Pth1=Pth2) will be described below. First, in the control method according to the first exemplary embodiment, formula (4) is satisfied:

[Formula 4]

$$Vis = R112 \times Iis \qquad (4)$$

where R112 is a resistance value of the resistor 112, and Iis is a flowing current value.

For example, a specification of the alternating-current voltage of the alternating-current power supply 101 is 100 Vac to 127 Vac, and a secondary-side voltage (output voltage Vout1) is 24 V. Further, a load current is 15 A, and an overload state threshold (Pth1) is 360 W (=24 V×15 A). In consideration of 100 Vac, which is the low value in the range of the specification of the alternating-current voltage of the alternating-current power supply 101, 100 Vac is calculated to be 141 Vdc from formula (1), and a threshold for the current value Iis of an overload state is calculated to be about Pth1 (360 W)/141 Vdc=2.55 A. In this case, the current value Iis at 127 Vac, which is the high value in the range of the specification of the alternating-current voltage of the alternating-current power supply 101, is also 2.55 A, so that Pth1 is calculated to be 127 Vac×√2×2.55=458 W, which is 458 W/24 V=19 A in terms of the load current.

In other words, a secondary-side load current value for determining that an overload state has occurred varies depending on the value of the alternating-current voltage. Specifically, in a case where the alternating-current voltage is 100 Vac, the secondary-side load current value is 15 A, whereas in a case where the alternating-current voltage is 127 Vac, the secondary-side load current value is 19 A. On the contrary, the method according to the third exemplary embodiment determines that an overload state has occurred in a case where a power corresponding to 360 W is detected. This makes it possible to detect an overload state based on substantially the same power even in a case where the alternating-current voltage changes, so that the secondary-side load current value is also substantially the same.

As described above, in the third exemplary embodiment, an overload state is detected based on the power, and this makes it possible to detect an overload state based on substantially the same secondary-side current value regardless of the value of the alternating-current voltage. As described above, with the third exemplary embodiment, the power supply apparatus 100 is protected as appropriate depending on a state of an overload that has occurred.

With the present disclosure, a power supply apparatus is protected as appropriate depending on a state of an overload that has occurred.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070835, filed Apr. 22, 2022, which is hereby incorporated by reference herein in its entirety.

What is claimed is:

1. A power supply apparatus configured to supply an output voltage corresponding to a voltage induced by a secondary winding, the power supply apparatus comprising:
   a transformer including a primary winding, the secondary winding, and an auxiliary winding;
   a switching element connected to the primary winding and configured to perform a switching operation;
   a first control device configured to operate by being supplied with a first voltage and configured to control the switching operation of the switching element; and
   a first detection device configured to detect an overload state,
   wherein, in a case where the overload state is detected by the first detection device after the switching operation is started and before the output voltage reaches a target voltage, the first control device performs a first process of maintaining a state where the switching operation is stopped,
   wherein, in a case where the overload state is detected by the first detection device after the output voltage reaches the target voltage, the first control device performs a second process of stopping the switching operation and, after a lapse of a first time, resuming the switching operation, and
   wherein the first control device performs detection of the overload state by the first detection device after the output voltage changes to a second voltage lower than the target voltage after a start of the switching operation.

2. The power supply apparatus according to claim 1, wherein, in a case where the first process is performed, the switching operation becomes ready to resume in a case where a voltage supplied to the first control device changes to a third voltage lower than the first voltage as a result of a stop of supply of a voltage from an alternating-current power supply.

3. The power supply apparatus according to claim 2, further comprising a second detection device configured to detect a current flowing through the primary winding,
   wherein the first detection device detects the overload state in a case where a current value detected by the second detection device in the first process and the second process is greater than a first threshold.

4. The power supply apparatus according to claim 3, wherein the first control device performs detection of the overload state by the first detection device after a period of performing a soft start operation elapses after a start of the switching operation.

5. The power supply apparatus according to claim 2, further comprising a second detection device configured to detect a current flowing through the primary winding, wherein the first detection device detects the overload state in a case where a current value detected by the second detection device in the first process is greater than a first threshold, and wherein the first detection device detects the overload state in a case where a current value detected by the second detection device in the second process is greater than a second threshold different from the first threshold.

6. The power supply apparatus according to claim 2, further comprising:
a second detection device configured to detect a current flowing through the primary winding; and
a third detection device configured to detect a voltage induced by the auxiliary winding,
wherein the first detection device detects the overload state in a case where a power value calculated based on a result of detection by the second detection device and a result of detection by the third detection device in the first process and the second process is greater than a third threshold.

7. The power supply apparatus according to claim 2, further comprising:
a second detection device configured to detect a current flowing through the primary winding; and
a third detection device configured to detect a voltage induced by the auxiliary winding,
wherein the first detection device detects the overload state in a case where a power value calculated based on a result of detection by the second detection device and a result of detection by the third detection device in the first process is greater than a third threshold, and
wherein the first detection device detects the overload state in a case where a power value calculated based on a result of detection by the second detection device and a result of detection by the third detection device in the second process is greater than a fourth threshold different from the third threshold.

8. An image forming apparatus comprising:
a power supply apparatus configured to supply an output voltage corresponding to a voltage induced by a secondary winding and including a transformer including a primary winding, the secondary winding, and an auxiliary winding, a switching element connected to the primary winding and configured to perform a switching operation, and a first control device configured to operate by being supplied with a first voltage and configured to control the switching operation of the switching element;
an image forming unit configured to form an image on a recording material; and
a second control unit configured to control the power supply apparatus and the image forming unit,
wherein the power supply apparatus includes a first detection device configured to detect an overload state,
wherein, in a case where the overload state is detected by the first detection device after the switching operation is started and before the output voltage reaches a target voltage, the first control device performs a first process of maintaining a state where the switching operation is stopped, and
wherein, in a case where the overload state is detected by the first detection device after the output voltage reaches the target voltage, the first control device performs a second process of stopping the switching operation and, after a lapse of a first time, resuming the switching operation, and wherein the first control device performs detection of the overload state by the first detection device after the output voltage changes to a second voltage lower than the target voltage after a start of the switching operation.

9. The image forming apparatus according to claim 8, wherein, in a case where the first process is performed, the switching operation becomes ready to resume in a case where a voltage supplied to the first control device changes to a third voltage lower than the first voltage as a result of a stop of supply of a voltage from an alternating-current power supply.

10. The image forming apparatus according to claim 9,
wherein the power supply apparatus includes a second detection device configured to detect a current flowing through the primary winding, and
wherein the first detection device detects the overload state in a case where a current value detected by the second detection device in the first process and the second process is greater than a first threshold.

11. The image forming apparatus according to claim 10, wherein the first control device performs detection of the overload state by the first detection device after a period of performing a soft start operation elapses after a start of the switching operation.

12. The image forming apparatus according to claim 8, wherein the second control unit detects a voltage value of the output voltage and transmits the detected voltage value to the first control device.

13. The image forming apparatus according to claim 9,
wherein the power supply apparatus includes a second detection device configured to detect a current flowing through the primary winding,
wherein the first detection device detects the overload state in a case where a current value detected by the second detection device in the first process is greater than a first threshold, and
wherein the first detection device detects the overload state in a case where a current value detected by the second detection device in the second process is greater than a second threshold different from the first threshold.

14. The image forming apparatus according to claim 9,
wherein the power supply apparatus includes a second detection device configured to detect a current flowing through the primary winding and a third detection device configured to detect a voltage induced by the auxiliary winding, and
wherein the first detection device detects the overload state in a case where a power value calculated based on a result of detection by the second detection device and a result of detection by the third detection device in the first process and the second process is greater than a third threshold.

15. The image forming apparatus according to claim 9,
wherein the power supply apparatus includes a second detection device configured to detect a current flowing through the primary winding and a third detection device configured to detect a voltage induced by the auxiliary winding,
wherein the first detection device detects the overload state in a case where a power value calculated based on a result of detection by the second detection device and a result of detection by the third detection device in the first process is greater than a third threshold, and
wherein the first detection device detects the overload state in a case where a power value calculated based on a result of detection by the second detection device and a result of detection by the third detection device in the second process is greater than a fourth threshold different from the third threshold.

* * * * *